US012056471B2

(12) United States Patent
Barrett

(10) Patent No.: US 12,056,471 B2
(45) Date of Patent: Aug. 6, 2024

(54) ARCHITECTURE FOR AUTOMATICALLY GENERATING COMPUTER-EXECUTABLE CODE FOR QUERYING NETWORKED RELATIONAL DATABASE MANAGEMENT SYSTEMS

(71) Applicant: Evernorth Strategic Development, Inc., St. Louis, MO (US)

(72) Inventor: Joshua P. Barrett, Lookout Mountain, GA (US)

(73) Assignee: Evernorth Strategic Development, Inc., St. Louis, MO (US)

( * ) Notice: Subject to any disclaimer, the term of this patent is extended or adjusted under 35 U.S.C. 154(b) by 98 days.

(21) Appl. No.: 17/966,398

(22) Filed: Oct. 14, 2022

(65) Prior Publication Data

US 2024/0126517 A1     Apr. 18, 2024

(51) Int. Cl.
*G06F 8/36*     (2018.01)
*G06F 8/38*     (2018.01)
*G06F 16/903*   (2019.01)

(52) U.S. Cl.
CPC .................. *G06F 8/36* (2013.01); *G06F 8/38* (2013.01); *G06F 16/90335* (2019.01)

(58) Field of Classification Search
None
See application file for complete search history.

(56) References Cited

U.S. PATENT DOCUMENTS

| | | | |
|---|---|---|---|
| 7,779,386 B2 * | 8/2010 | Seitz .................. | G06F 16/2455 717/121 |
| 7,913,224 B2 | 3/2011 | Nissen | |
| 7,970,755 B2 | 6/2011 | Belknap | |
| 8,474,048 B2 | 6/2013 | Masood | |
| 9,026,986 B2 | 5/2015 | Collinson | |
| 9,563,406 B1 * | 2/2017 | Hicklin .................... | G06F 8/34 |
| 9,600,545 B2 | 3/2017 | Pryce | |
| 9,619,250 B2 | 4/2017 | Gentile | |
| 9,830,204 B2 | 11/2017 | Mettrick | |
| 10,015,164 B2 | 7/2018 | Hamburg | |

(Continued)

OTHER PUBLICATIONS

Krikellas, "Generating code for holistic query evaluation", 2010, IEEE (Year: 2010).*

*Primary Examiner* — Hossain M Morshed
(74) *Attorney, Agent, or Firm* — Miller Johnson

(57) ABSTRACT

A system for automatically generating computer-executable code includes a user device including a communications interface, a code generation module, and a data store, and a storage device operatively coupled to the code generation module via a network and the communications interface. The storage device includes a relational database management system. The code generation module is configured to parse a selected feature from the feature library to determine a first helper function of the one or more helper functions and a selected template function of the one or more template functions, receive a first argument for the first helper function, generate a first output value by associating the first helper function with the first argument, generate precursor executable code by adding the first output value to the selected template function as a first argument of the selected template function, and execute the precursor executable code to generate bespoke code.

20 Claims, 20 Drawing Sheets

(56) References Cited

U.S. PATENT DOCUMENTS

| | | |
|---|---|---|
| 10,409,462 B2 | 9/2019 | Gentile |
| 10,430,169 B2 | 10/2019 | Munshi |
| 10,482,394 B2 | 11/2019 | Syed |
| 10,581,838 B2 | 3/2020 | Hamburg |
| 11,010,144 B2* | 5/2021 | Papageorgiou ..... G06F 9/44505 |
| 2003/0004979 A1* | 1/2003 | Woodring ................. G06F 8/30 |
| | | 707/999.203 |
| 2004/0215604 A1 | 10/2004 | Ivanov |
| 2012/0005190 A1 | 1/2012 | Faerber |
| 2013/0227446 A1* | 8/2013 | Zala ........................ G06F 8/38 |
| | | 715/762 |
| 2016/0041815 A1* | 2/2016 | Bhagat ..................... G06F 8/36 |
| | | 717/107 |
| 2016/0103897 A1 | 4/2016 | Nysewander |
| 2019/0347271 A1* | 11/2019 | Adamut ................. H04L 67/01 |

* cited by examiner

```
vars_to_sum = ['TotalPaid', 'AllowedAmt']

print(a.sql_pivot_query(vars_select = ['MemberID', 'anchor_dt'],
                        gb_vars_list = ['MemberID', 'anchor_dt'],
                        vars_sum = vars_to_sum,
                        vars_avg = False,
                        vars_min = False,
                        vars_max = False), end = ''
                        )
```

FIG. 7

```
SELECT a.anchor_dt
, a.MemberID
, CAST(SUM(a.TotalPaid) as FLOAT) as sum_TotalPaid_inp_claim_15_3_3mthro
, CAST(SUM(a.AllowedAmt) as FLOAT) as sum_AllowedAmt_inp_claim_15_3_3mthro
FROM OSS_PROVISIONING_V.sdoGBSAClaim a
WHERE a.DOSBegin >= ADD_MONTHS(CAST('2020-01-01' AS DATE, -15) AND
 a.DOSBegin <= ADD_MONTHS(CAST('2020-01-01' AS DATE, -3) AND a.PaidDateKey <
 ADD_MONTHS(CAST('2020-01-01' AS DATE), 0)
GROUP BY a.anchor_dt
, a.MemberID
```

FIG. 8

```
select_gb = ['MemberID', 'ClaimID', 'dxcode1', 'dxcode2']
outer_select_gb = ['MemberID']
vars_dcnt = ['dxcode1', 'dxcode2']
vars_cond_cnt_like_dict = {'dxcode1': ['"J44%"', '"N18%"']} sql_fxn_test_nest = a.sql_nested_query(inner_vars_select = list(set(select_gb+outer_select_gb)),
                        join_schema = 'LABSPACE',
                        join_table = 'MY_MEM_LIST',
                        join_type = 'INNER JOIN',
                        left_on = ['MemberID', 'other_mem_id'],
                        vars_select = outer_select_gb,
                        vars_dcnt = vars_dcnt,
                        vars_cond_cnt_like_dict = vars_cond_cnt_like_dict
                        )
```

FIG. 9

```
with a as (
SELECT a.dxcode1
, a.dxcode2
, a.MemberID
, a.other_mem_id
, a.ClaimID
FROM OSS_PROVISIONING_V.sdoGBSAClaim a
INNER JOIN LABSPACE.MY_MEM_LIST b
ON a.MemberID = b.MemberID
AND a.other_mem_id = b.other_mem_id
WHERE a.DOSBegin >= ADD_MONTHS(CAST('2020-01-01' AS DATE), -15) AND a.DOSBegin <= ADD_MONTHS(CAST('2020-01-01' AS DATE), -3) AND a.PaidDateKey < ADD_MONTHS(CAST('2020-01-01' AS DATE), 0)
GROUP BY a.ClaimID
, a.dxcode1
, a.dxcode2
, a.MemberID
)
SELECT a.MemberID
, COUNT(DISTINCT a.dxcode1) as dcnt_dxcode1_inp_claim_15_3_3mthro
, COUNT(DISTINCT a.dxcode2) as dcnt_dxcode2_inp_claim_15_3_3mthro
, SUM(case when CAST(a.dxcode1 AS VARCHAR(50)) LIKE 'J44%' then 1 else 0 end) as cnt_dxcode1_J44_inp_claim_15_3_3mthro
, SUM(case when CAST(a.dxcode1 AS VARCHAR(50)) LIKE 'N18%' then 1 else 0 end) as cnt_dxcode1_N18_inp_claim_15_3_3mthro
FROM a
GROUP BY a.MemberID
```

FIG. 10 value_query_parameters 1172

| helper_function_7 1302 | helper_function_16 1338 |
|---|---|
| custom_arguments 1304 | custom_arguments 1340 |

| helper_function_8 1306 | helper_function_17 1342 |
|---|---|
| custom_arguments 1308 | custom_arguments 1344 |

| helper_function_9 1310 | helper_function_18 1346 |
|---|---|
| custom_arguments 1312 | custom_arguments 1348 |

| helper_function_10 1314 | helper_function_19 1350 |
|---|---|
| custom_arguments 1316 | custom_arguments 1352 |

| helper_function_11 1318 | helper_function_20 1354 |
|---|---|
| custom_arguments 1320 | custom_arguments 1356 |

| helper_function_12 1322 | helper_function_21 1358 |
|---|---|
| custom_arguments 1324 | custom_arguments 1360 |

| helper_function_13 1326 | helper_function_22 1362 |
|---|---|
| custom_arguments 1328 | custom_arguments 1364 |

| helper_function_14 1330 | helper_function_23 1366 |
|---|---|
| custom_arguments 1332 | custom_arguments 1368 |

| helper_function_15 1334 | helper_function_24 1370 |
|---|---|
| custom_arguments 1336 | custom_arguments 1372 |

FIG. 13

```
{
  "author": "John Doe",
  "source_table": "OSS_PROVISIONING_V.sdoGBSAClaim"
  "type": "feature"
  "feature_set": "inpatient"
  "definition": "Sum Total Paid claims if Level2Bucket in ('Inpatient
    Acute', 'Inpatient Behavioral Health', 'Inpatient LTAC', 'Inpatient
    Rehab', 'Inpatient SNF'). 12 month period, starting 15 months before
    anchor_date with 3 months of runout"
  "custom_params": "{'vars_select: ['MemberID'], 'gb_vars_list':
    ['MemberID'], 'anchor_dt': '2020-01-01', 'where_filter_additions':
    False, 'join_schema': False, 'join_table': False}"
  "query_params": "{'time_col_svc':'DOSBegin',
    'from_schema':'OSS_PROVISIONING_V', 'from_table': 'sdoGBSAClaim',
    'time_col_pd': 'PaidDateKey', 'time_col_pd_end': 3, 'where_str': "1=1
    AND a.Level2Bucket in ('Inpatient Acute', 'Inpatient Behavioral Health',
    'Inpatient LTAC', 'Inpatient Rehab', 'Inpatient SNF')", 'vars_sum':
    ['AllowedAmt', 'TotalPaid'], 'vars_avg': False, 'vars_cnt': False,
    'vars_max': False, 'vars_min': False, 'vars_dcnt': ['ClaimID'],
    'vars_cond_cnt_like_dict': False, 'vars_cond_cnt_like_any_dict': False,
    'experience_feat_name': 'inp_claim_', 'svc_beg_lag': -15, 'svc_end_lag':
    -3, 'db_type': 'td'}"
  "sql_template_type": "write_sql"
  "sql_template": "sql_pivot_query"
}
```

FIG. 14

ARCHITECTURE FOR AUTOMATICALLY GENERATING COMPUTER-EXECUTABLE CODE FOR QUERYING NETWORKED RELATIONAL DATABASE MANAGEMENT SYSTEMS

FIELD

The present disclosure relates to automated code generation tools and, more particularly, to automated code generation tools with adaptive graphical user interfaces for automatically generating computer-executable code.

BACKGROUND

Traditionally, software development requires individual developers to manually plan for, write, and then debug hundreds or thousands of lines of code. When scaled to the enterprise level, traditional software development involves hundreds or thousands of developers manually planning for, writing, and then debugging thousands or even millions of lines of code. Generally, each individual software developer will introduce their own styles and idiosyncrasies—along with their own mistakes and bugs—into the lines of code they write. As a result, the larger and more complicated the enterprise project grows, the less homogenized and more eccentric the code tends to become. This often leads to an increase in bugs in the code itself and a decrease in computational efficiency as the code is executed. Furthermore, less-homogenized idiosyncratic code tends to be more difficult to maintain and improve, particularly if the original software developers are no longer available as a resource for the enterprise. Thus, there is a need for software development tools that increase the maintainability and quality of software code.

Additionally, writing computer code is generally considered one of the more difficult technical tasks, and tends to require a high level of technical proficiency in order to perform competently. Computer coding skills are often required to perform tasks unrelated to traditional software development. For example, in data science, large quantities of information are often stored in relational databases. In order to access the information stored in relational databases, data scientists often need to formulate long, complicated queries in domain-specific programming languages. As a result, data scientists need to learn and master new programming skills in order to effectively retrieve the data they need from relational databases. Because software programming is not necessarily within the core skillset of every data scientist, there exists a need for automated code generation tools—for example, ones that are implemented through a graphical user interface—and that do not require specialized programming knowledge.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system for automatically generating computer-executable code includes a user device including a communications interface, a code generation module, and a data store including a helper function library, a template function library, and a feature library. The helper function library includes one or more helper functions, the template function library contains one or more template functions, and the feature library contains one or more features. The system includes a storage device operatively coupled to the code generation module via a network and the communications interface. The storage device includes a relational database management system. The code generation module is configured to parse a selected feature from the feature library to determine a first helper function of the one or more helper functions and a selected template function of the one or more template functions, receive a first argument for the first helper function, generate a first output value by associating the first helper function with the first argument, generate precursor executable code by adding the first output value to the selected template function as a first argument of the selected template function, and execute the precursor executable code to generate bespoke code. The bespoke code is in a domain-specific programming language and is configured to cause the user device to query the relational database management system.

In other features, the code generation module is configured to parse the selected feature from the feature library to determine a second helper function of the one or more helper functions and parse the selected feature from the feature library to determine a second argument for the second helper function. In other features, the code generation module is configured to generate a second output value by associating the second helper function with the second argument. In other features, the code generation module is configured to generate precursor executable code by adding the second output value to the selected template function as a second argument of the selected template function. In other features, the code generation module is configured to generate a first user interface element. The first user interface element is configured to allow a user to input arguments to the first user interface element and store the input arguments as the first argument in response to the user inputting arguments to the first user interface element.

In other features, the code generation module is configured to generate a second user interface element. The second user interface element is configured to display at least a portion of the bespoke code to the user. In other features, the code generation module is configured to generate a third user interface element. The third user interface element is selectable by the user and the code generation module is configured to automatically execute the bespoke code in response to the user selecting the third user interface element. In other features, the bespoke code is Structured Query Language (SQL) code. In other features, the data store includes the second argument. In other features, the feature comprises a custom parameters data field including the first helper function and a query parameters data field including the second helper function and the second argument.

A computerized method for automatically generating computer-executable code includes parsing a selected feature from a feature library to determine a first helper function, a second helper function, an argument for the second helper function, and a selected template function, receiving a first argument for the first helper function, generating a first output value by associating the first helper function with the first argument, and generating a second output value by associating the second helper function with the second argument. The method includes generating precursor executable code by adding the first output value to the selected template function as a first argument of the selected template function and adding the second output value to the selected template function as a second argument of the selected template function. The method includes executing the precursor executable code to generate bespoke code. The bespoke code is in a domain-specific programming language and is configured to cause a user device to query a relational database management system.

The method includes generating a first user interface element. The first user interface element is configured to allow a user to input arguments to the first user interface element. The method includes storing the input arguments as the first argument in response to the user inputting arguments to the first user interface element. The method includes generating a second user interface element. The second user interface element is configured to display at least a portion of the bespoke code to the user. The method includes generating a third user interface element. The third user interface element is selectable by the user. The method includes automatically executing the bespoke code in response to the user selecting the second user interface element. In other features, the bespoke code is Structured Query Language (SQL) code.

A non-transitory computer-readable medium includes executable instructions for automatically generating computer-executable code. The executable instructions include parsing a selected feature from a feature library to determine a first helper function, a second helper function, an argument for the second helper function, and a selected template function. The executable instructions include receiving a first argument for the first helper function, generating a first output value by associating the first helper function with the first argument, and generating a second output value by associating the second helper function with the second argument. The executable instructions include generating precursor executable code by adding the first output value to the selected template function as a first argument of the selected template function, and adding the second output value to the selected template function as a second argument of the selected template function. The executable instructions include executing the precursor executable code to generate bespoke code. The bespoke code is in a domain-specific programming language and is configured to cause a user device to query a relational database management system.

In other features, the executable instructions include generating a first user interface element. The first user interface element is configured to allow a user to input arguments to the first user interface element. The executable instructions include storing the input arguments as the first argument in response to the user inputting arguments to the first user interface element. In other features, the executable instructions include generating a second user interface element. The second user interface element is configured to display at least a portion of the bespoke code to the user. In other features, the executable instructions include generating a third user interface element. The third user interface element is selectable by the user. The executable instructions include automatically executing the bespoke code in response to the user selecting the second user interface element. In other features, the bespoke code is Structured Query Language (SQL) code.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 7 shows example Python code representing a user command for inputting helper functions into a template function.

FIG. 8 shows an example SQL code string generated by a user command.

FIG. 9 shows example Python code representing a user command for inputting helper functions into a template function.

FIG. 10 shows an example SQL code string generated by a user command.

FIG. 13 is a block diagram showing an example structure for a query parameters data field.

FIG. 14 shows an example JSON file corresponding to an example feature described with reference to FIGS. 11-13.

In the drawings, reference numbers may be reused to identify similar and/or identical elements.

DETAILED DESCRIPTION

High-Volume Pharmacy

Figure 1:
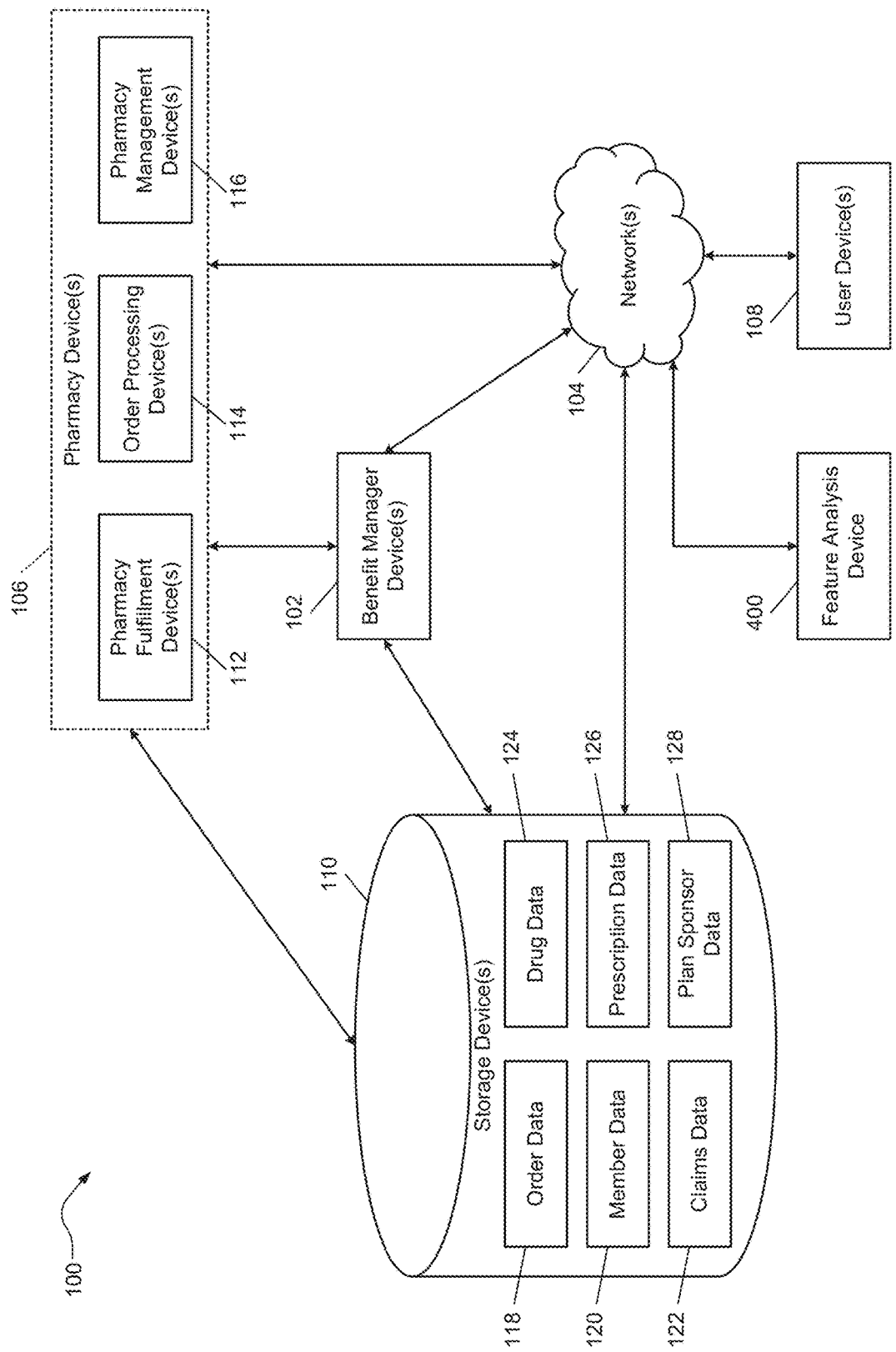
FIG. 1 is a functional block diagram of an example system including a high-volume pharmacy.

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Virginia.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfillment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, address, telephone number, e-mail address, prescription drug history, etc. The member data 120 may include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member).

The drug data 124 may include drug name (e.g., technical name and/or common name), other names by which the drug is known, active ingredients, an image of the drug (such as in pill form), etc. The drug data 124 may include information associated with a single medication or multiple medications.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
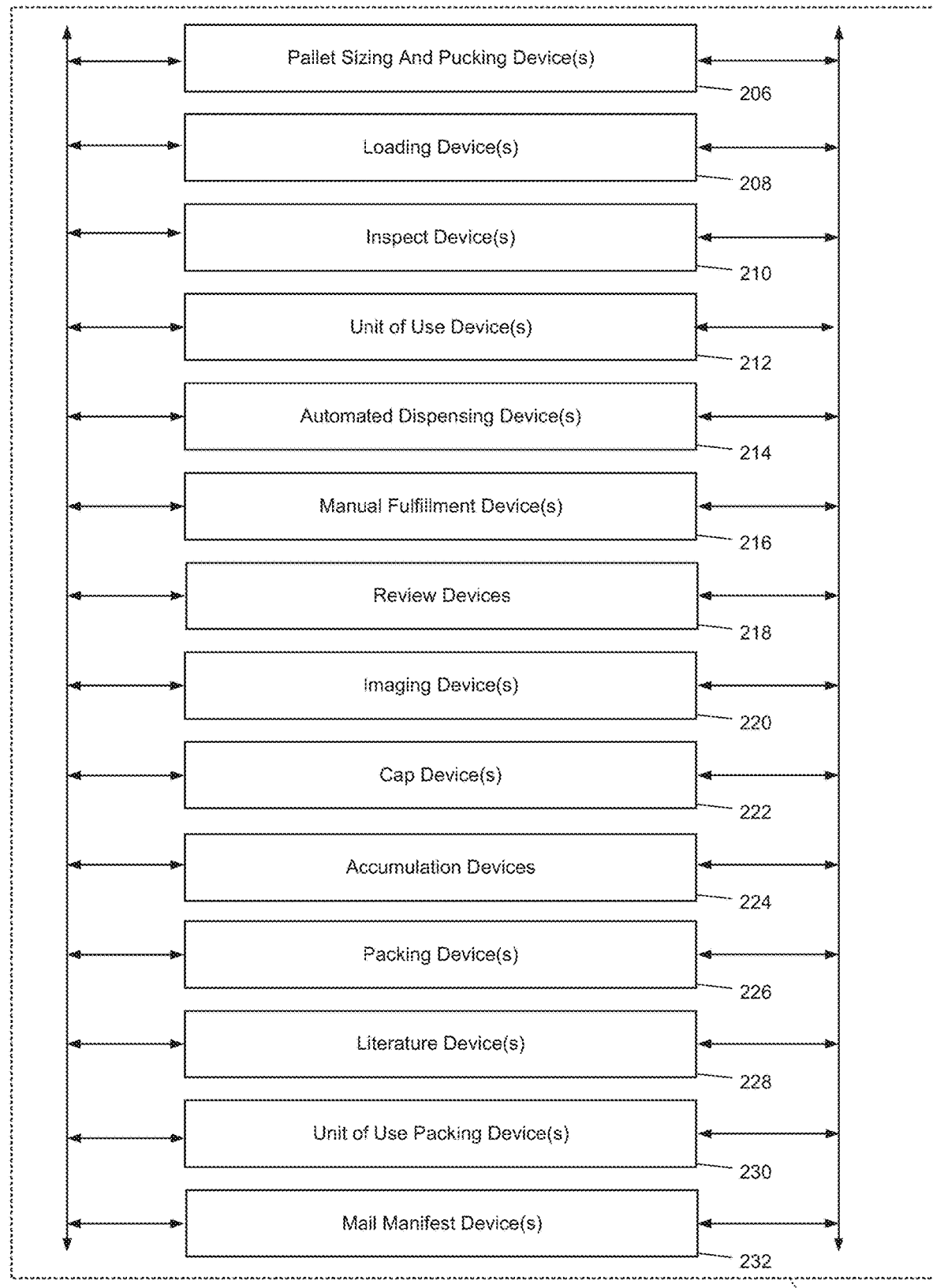
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 3:
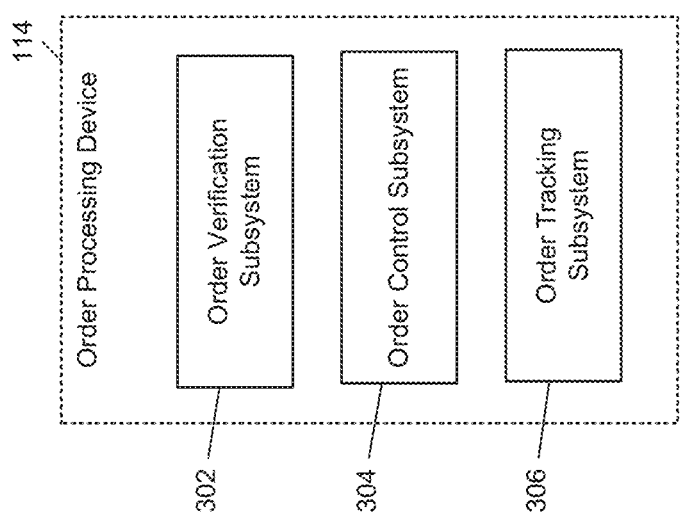
FIG. 3 is a functional block diagram of an example order processing device, which may be deployed within the system of FIG. 1.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Code Generation Module and Data Store(s)

Returning to FIG. 1, in various implementations, the system 100 includes a feature analysis device 400. The feature analysis device 400 may communicate with the other devices of the system 100 directly and/or over the network(s) 104. In various implementations, the feature analysis device 400 may include automated code generation tools configured to automatically generate software code in response to user inputs to a graphical user interface. In various implementations, the automated code generation tools may automatically generate domain-specific language software code for querying relational database management systems. For example, the automated code generation tools may automatically generate Structured Query Language (SQL) code for querying relational database management systems. In various implementations, the automated code generation tools may be deployed to one or more of the user device(s) 108 instead of or in addition to the feature analysis device 400.

Figure 4:
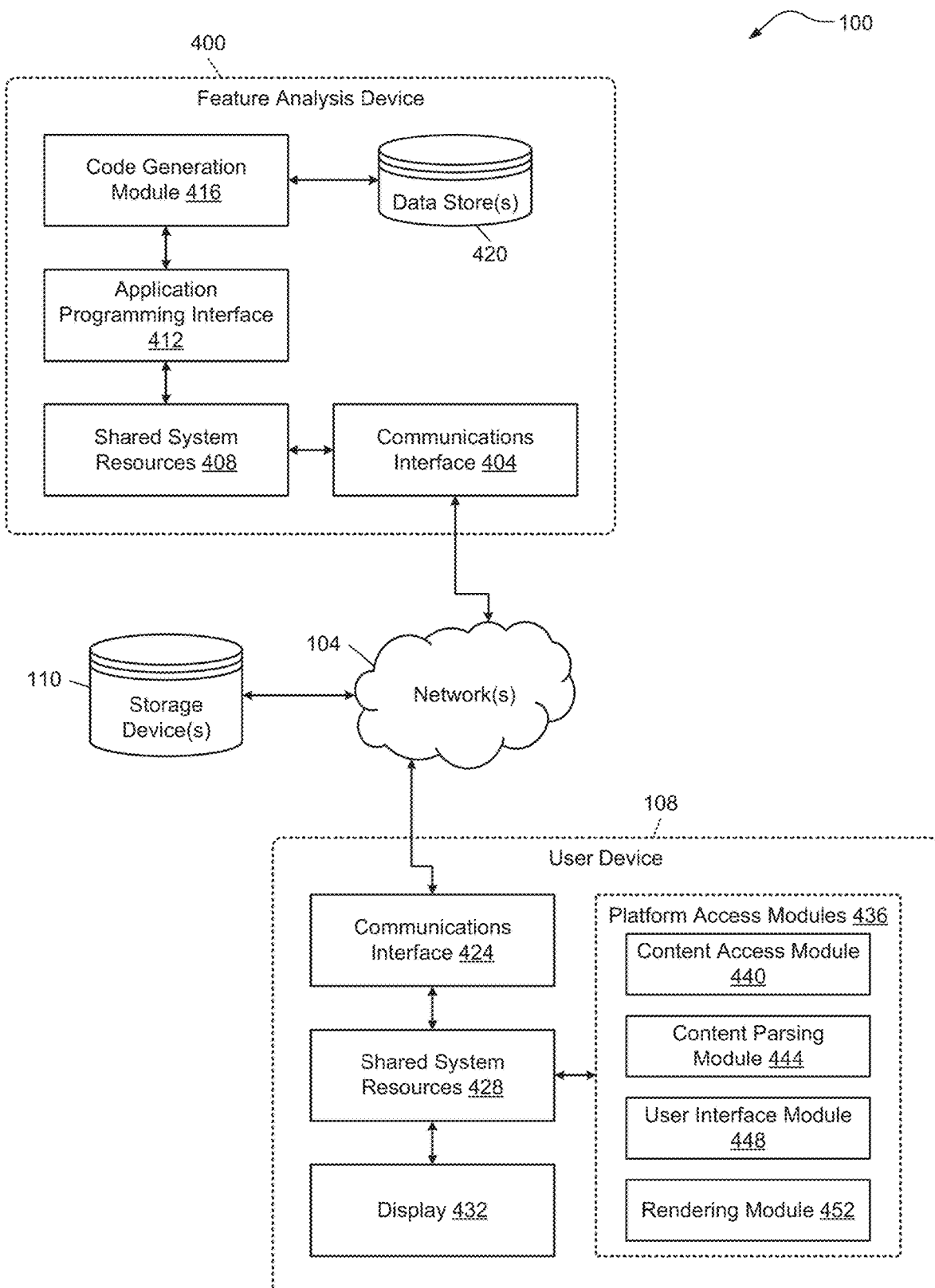
FIG. 4 is a block diagram of an example system with some examples of a feature analysis device and some examples of a user device shown in detail.

FIG. 4 is a partial block diagram of the system 100 with some examples of the feature analysis device 400 and some examples of the user device 108 shown in detail. As shown in FIG. 4, the feature analysis device 400 may include a communications interface 404, shared system resources 408, software modules (such as an application programming interface 412 and/or a code generation module 416), and/or one or more data store(s) 420. In various implementations, the communications interface 404 may be suitable for communicating with other communications interfaces via the network(s) 104. In various implementations, the communications interface 404 may include a transceiver suitable for sending and/or receiving data to and from other communications interfaces via the network(s) 104. In various implementations, the shared system resources 408 may include one or more processors, volatile or non-volatile computer memory (such as random access memory), system storage (such as non-transitory computer-readable storage media), and/or one or more system buses connecting the components of the feature analysis device 400.

In various implementations, the application programming interface 412 and/or the code generation module 416 may be software modules stored on non-transitory computer-readable storage media. In various implementations, the data store(s) 420 may include non-transitory computer-readable storage media. In various implementations, the communications interface 404, the application programming interface 412, the code generation module 416, and/or the data store(s) 420 may be operatively coupled to each other via the shared system resources 408. In various implementations, other devices of the system 100 such as the user device(s) 108—may access the code generation module 416 via the network(s) 104, the communications interface 404, the shared system resources 408, and/or the application programming interface 412. In various implementations, the application programming interface 412 may be a software module that provides an interface for software on devices external to the feature analysis device 400 to communicate with the code generation module 416. In various implementations, the code generation module 416 may access the storage devices 110 via the shared system resources 408, the communications interface 404, and/or the network(s) 104.

As shown in FIG. 4, the user device 108 may include a communications interface 424, shared system resources 428, a display 432, and/or platform access modules 436. In various implementations, the communications interface 424 may be suitable for communicating with other communications interfaces via the network(s) 104. In various implementations, the communications interface 424 may include a transceiver suitable for sending and/or receiving data to and from other communications interfaces, such as the communications interface 404, via the network(s) 104. In various implementations, the shared system resources 428 may include one or more processors, volatile or non-volatile computer memory (such as random access memory), system storage (such as non-transitory computer-readable storage media), and/or one or more system buses connecting the components of the user device 108. In various implementations, the display 432 may include a user input device in addition to an output device. For example, the display 432 may include a touchscreen.

In various implementations, the platform access modules 436 may be software modules stored on non-transitory computer-readable storage media. In various implementations, the communications interface 424, the display 432, and/or the platform access modules 436 may be operatively coupled to the shared system resources 428. In various implementations, the communications interface 424, the display 432, and/or the platform access modules 436 may be operatively coupled to each other via the shared system resources 428. In various implementations, the platform access modules 436 may access the code generation module 416 via the shared system resources 428, the communications interface 424, the networks 104, the communications interface 404, the shared system resources 408, and/or the application programming interface 412. In various implementations, the platform access modules 436 may access the storage device(s) 110 via the shared system resources 428, the communications interface 424, and/or the network(s) 104.

In various implementations, the platform access modules 436 may include a content access module 440, a content parsing module 444, a user interface module 448, and/or a rendering module 452. In various implementations, the content access module 440 may retrieve URLs using Internet protocols such as the Hypertext Transport Protocol (HTTP), the Hypertext Transport Protocol Secure (HTTPS), and/or the File Transport Protocol (FTP). In various implementations, the content parsing module 444 may receive content from the content access module 440 and render a web page based on the received content. In various implementations, the user interface module 448 may generate a user interface for displaying and interacting with the rendered web page, and the rendering module 452 may render the user interface and/or the web page for display on the display 432.

Figure 5:
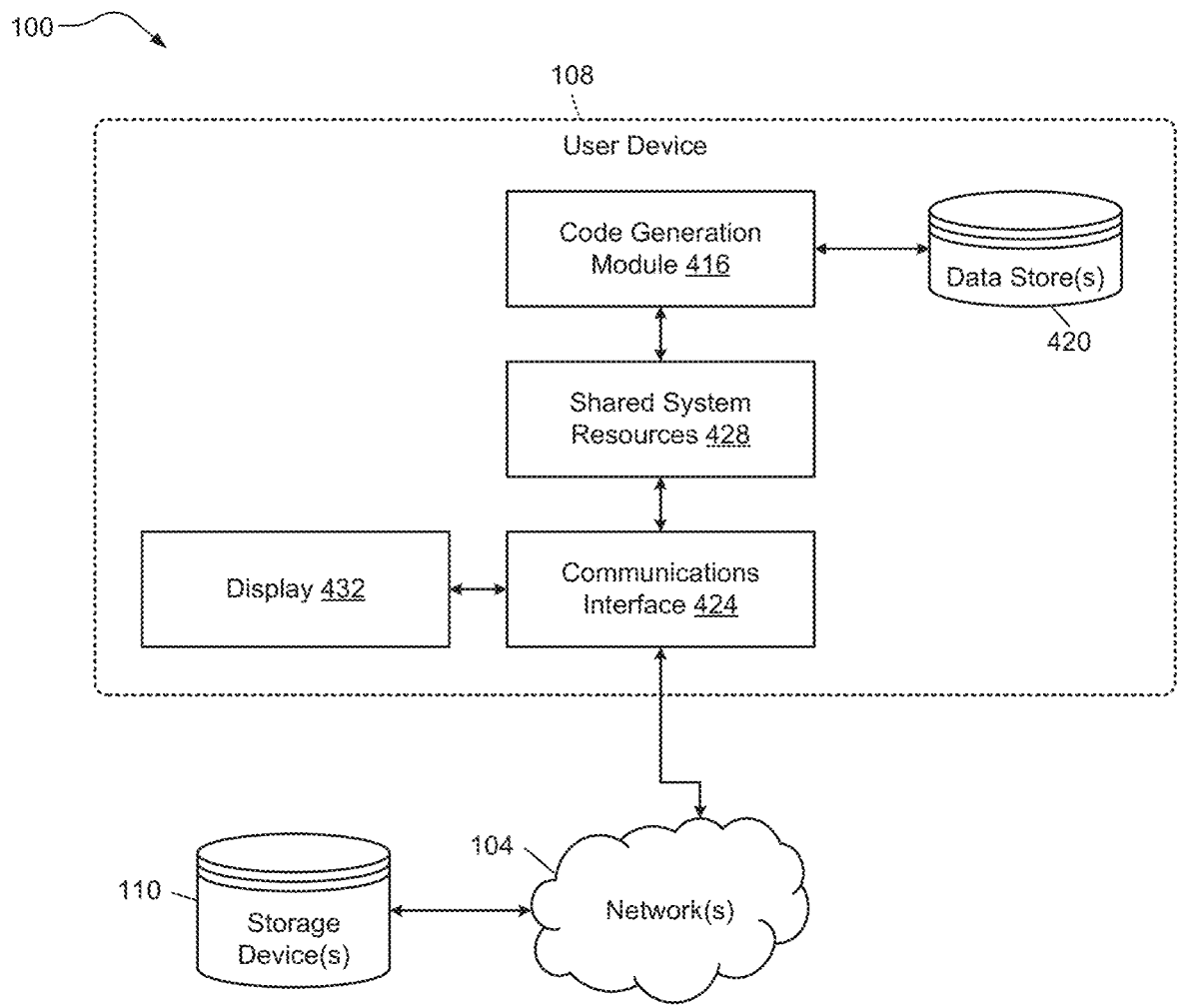
FIG. 5 is a block diagram of a system with some examples of a user device shown in detail.

FIG. 5 is a block diagram of a portion of the system 100 with some examples of the user device 108 shown in detail. As shown in FIG. 5, in various implementations, the user device 108 may include the code generation module 416 and/or the data store(s) 420. In various implementations, the communications interface 424, display 432, code generation module 416, and/or data store(s) 420 may be operatively coupled to the shared system resources 428. In various implementations, the communications interface 424, display 432, code generation module 416, and/or data store(s) 420 may be operatively coupled to each other via the shared system resources 428. In various implementations, the code generation module 416 may access the storage device(s) 110 via the communications interface 424 and network(s) 104.

Figure 6:
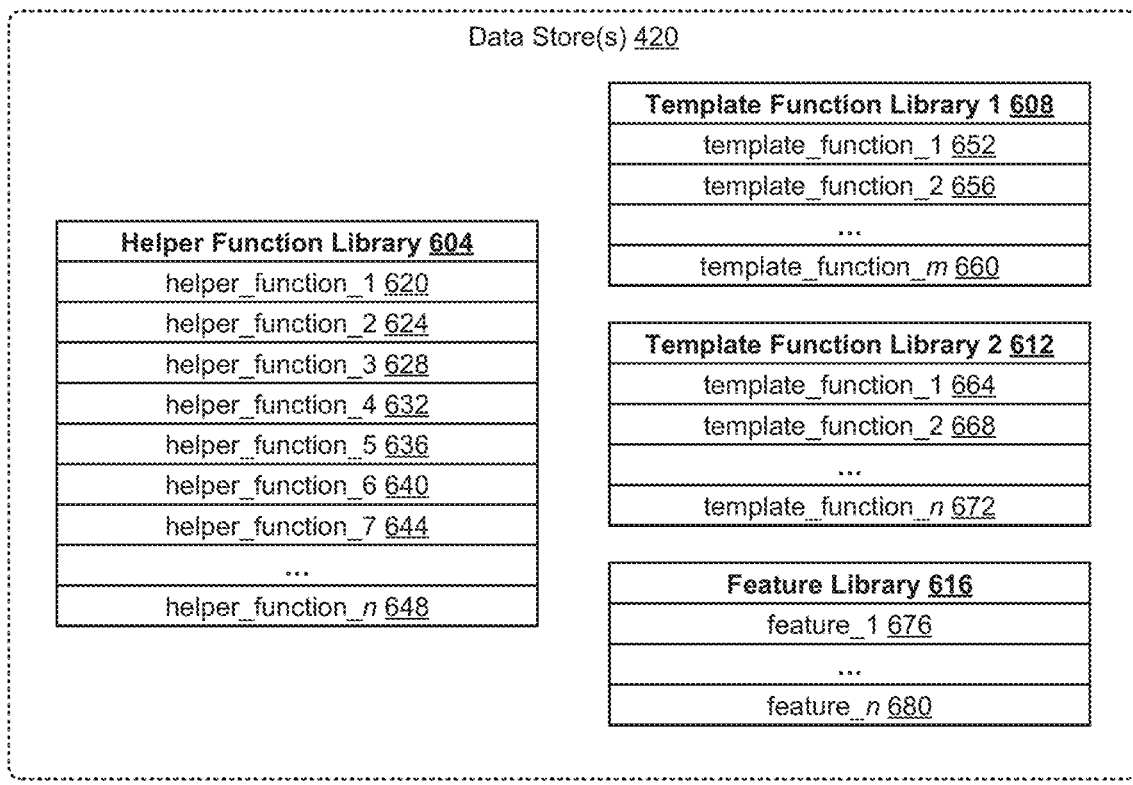
FIG. 6 is a block diagram showing example libraries and data objects that may be stored in a data store.

FIG. 6 is a block diagram showing example libraries and data objects that may be stored in the data store(s) 420. For example, as shown in FIG. 6, the data store(s) 420 may include one or more libraries, such as a helper function library 604, a first template function library 608, a second template function library 612, and/or a feature library 616. The helper function library 604 may include one or more helper functions. In various implementations, each helper function may include computer code in a first programming language that is suitable for generating output code in the first programming language and/or a second programming language. In various implementations, arguments may be input into the helper function, and the helper function may output a string in the first programming language and/or the second programming language.

In various implementations, the first language may be Python, and the second language may be a domain-specific programming language such as the Structured Query Language (SQL). In various implementations, the helper function may accept a list of variable names in string format as arguments and output a comma-delimited string in the second programming language. In various implementations, the output of the helper function may be a comma-delimited SQL string. In various implementations, the helper function may have a name corresponding to the SQL command the output string performs. For example, if the helper function is intended to output a "select" command in SQL, the helper function may be named "select." Similarly, if the helper function is intended to output a "group by" command in SQL, the helper function may be named "group_by." If implemented, such a naming scheme helps clearly communicate the functionality of the helper function to the user without necessitating that the user consult documentation to determine the functionality of each helper function.

As shown in FIG. 6, the helper function library 604 may include any number of helper functions. For example, the helper function library may include a helper_function_1 620, a helper_function_2 624, a helper_function_3 626, a helperful_function_4 630, a helper_function_5 634, a helper_function_6 638, a helper_function_7 642, and/or a helper function n 648. In various implementations, helper_function_1 620 may be configured to generate a string for executing a "select" command in SQL, helper_function_2 624 may be configured to generate a string for executing a "group by" command in SQL, helper_function_3 628 may be configured to generate a string for executing a "sum" command in SQL, helper_function_4 632 may be configured to generate a string for executing a "average" command in SQL, helper_function_5 636 may be configured to generate a string for executing a "custom literal string" command in SQL, helper_function_6 640 may be configured to generate a string for executing a "from" command in SQL, and helper_function_7 644 may be configured to generate a string for executing a "where" command in SQL.

In various implementation, the first template function library 608 and/or the second template function library 612 may include one or more template functions. In various implementations, each helper function may include computer code in the first programming language that is suitable for generating output code in the first programming language and/or a second programming language. In various implementations, arguments may be input into the helper function, and the helper function may output a string in the first programming language and/or the second programming language. In various implementations, the helper function may accept a list of helper functions (including their arguments) in string format as arguments and output a comma-delimited string in the second programming language. In various implementations, the output of the helper function may be a comma-delimited SQL string. In various implementations, the helper functions may be programmed to provide a consistent coding style and naming conventions for the data fields they create.

In various implementations, each of the template functions in the first template function library 608 may be suitable for generating output code for a SQL pivot query. In various implementations, a SQL pivot query groups by a set of variables and performs an aggregation on other variables. In various implementations, each of the template functions in the second template function library 612 may be templates suitable for generating output code for a SQL nested query. In various implementations, a SQL nested query first performs some kind of data operation via an inner query and then performs a SQL pivot query on the results of the inner query. In various implementations, the first template function library 608 may include any number of template functions, such as template_function_1 652, template_function_2 656, and/or template_function_m 660. In various implementations, the second template function library 612 may include any number of template functions, such as template_function_3 664, template_function_4 668, and/or template_function_n 672. In various implementations, template functions may be designed after coding idioms in order to ensure templates are reusable for multiple goals and purposes, making template functions easily customizable. This design may also make the storing, sharing, and reusing of custom instances that reflect a particular domain expertise among multiple users of the system appealing.

FIG. 7 shows example Python code representing a user command for inputting helper functions into a template function. In the example of FIG. 7, the template function "sql_pivot_query" generates a SQL pivot query, and each of "vars_select," "gb_vars_list," "vars_sum," "vars_avg," "vars_min," and "vars_max" are helper functions. In the example of FIG. 7, "['Member ID', 'anchor_dt'], vars_to_sum, and False are arguments to the helper functions, while the helper functions and their arguments are arguments to the template function. FIG. 8 shows an example SQL code string generated by the user command of FIG. 7.

FIG. 9 shows example Python code representing a user command for inputting helper functions into a template function. In the example of FIG. 9, the template function "sql_nested_query" generated a SQL nested query. In the example of FIG. 9, "inner_vars_select" represents a helper function for performing the inner query, and each of "join_schema," "join_table," "join_type," "left_on," "vars_select," "vars_dcnt," and "vars_cond_cnt_like_dict" are helper functions for performing the pivot query. In various implementations, as shown in FIG. 9, each of the helper functions may be appended as inputs to the template function. In various implementations, the helper functions may be joined with a join function. In various implementations, the join function may be provided as an input to the helper function. FIG. 10 shows an example SQL code string generated by the user command of FIG. 9.

Figure 11:
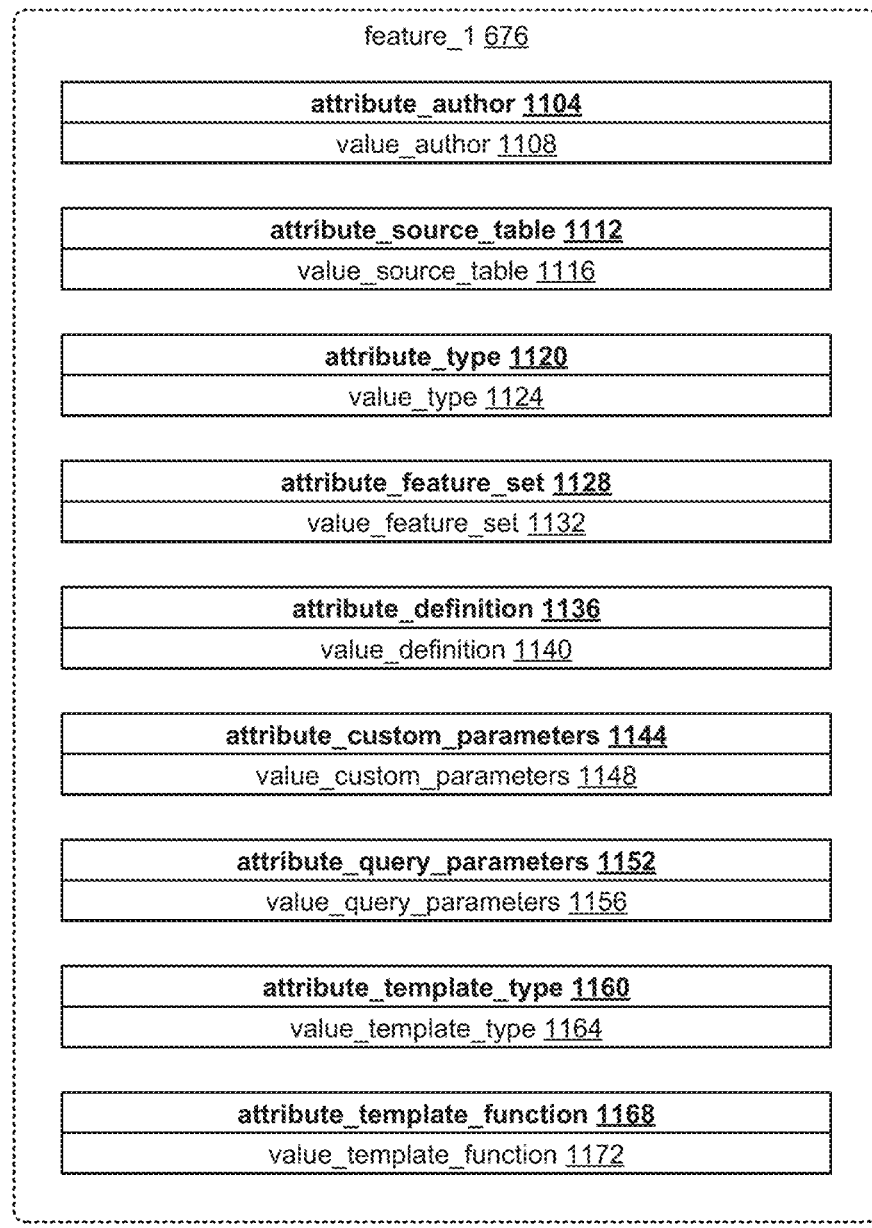
FIG. 11 is a block diagram showing an example structure for a feature stored in a feature library.

FIG. 11 is a block diagram showing an example structure for a feature, such as feature_1 676, stored in the feature library 616. In various implementations, each of the features in the feature library 616 may be computer data objects structured as sequences of electronic text. In various implementations, each of the features in the feature library 616 may be computer data objects using human-readable text to store attribute-value pairs and arrays. For example, in various implementations, feature_1 676 may include an attribute_author data field 1104 associated or paired with a value_author data field 1108. The attribute_author data field 1104 may indicate that the value_author data field 1108 describes the author of feature_1 676. In various implementations, feature_1 s may include an attribute_source_table 1112 data field associated or paired with a value_source_table data field 1116. The attribute_source_table 1112 data field may indicate that the value_source_table data field 1116 describes the source table on which feature_1 676 is intended to perform an operation.

In various implementations, feature_1 676 may include an attribute_type data field 1120 associated or paired with a value_type data field 1124. The attribute_type data field 1120 may indicate that the value_type data field 1124 describes the type of feature that feature_1 676 relates to. In various implementations, feature_1 676 may include an attribute_feature_set data field 1128 associated or paired with a value_feature_set data field 1132. The attribute_feature_set data field 1128 may indicate that the value_feature_set data field 1132 describes a set of features that feature_1 676 belongs to. In various implementations, feature_1 676 may include an attribute_definition data field 1136 associated or paired with a value_definition data field 1140. The attribute_definition data field 1136 may indicate that the value_definition data field 1140 contains a definition of the feature that feature_1 676 relates to.

In various implementations, feature_1 676 may include an attribute_custom_parameters data field 1144 associated or paired with a value_custom_parameters data field 1148. The attribute_custom_parameters data field 1144 may indicate that the value_custom_parameters data field 1148 contains parameters that the user can change to customize the implementation of feature_1 676. In various implementations, feature_1 676 may include an attribute_query_parameters data field 1152 associated or paired with a value_query_parameters data field 1156. The attribute_query_parameters data field 1152 may indicate that the value_query_parameters data field 1156 contains parameters that are characteristic of the feature_1 676 and that should not be changed by the user.

In various implementations, feature_1 676 may include an attribute_template_type data field 1160 associated or paired with a value_template_type data field 1164. The attribute_template_type data field 1160 may indicate that the value_template_type data field 1164 defines a type of template feature_1 676 uses. For example, in various implementations, the value_template_type data field 1164 may specify a custom Python template function, such as a "write_sql" function type. In various implementations, "write_sql" may be a custom instance of a software module configured to write code in the second language, such as SQL or any domain-specific programming language. In various implementations, the value_template_type data field 1164 may specify a standardized Python template function, which could be composed using the Python templating tool known as "jinja," thus making the system compatible with function types composed with open-source tools.

In various implementations, feature_1 676 may include an attribute_template_function data field 1168 associated or paired with a value_template_function data field 1172. In various implementations, the attribute_template_function data field 1168 may indicate that the value_template_function data field 1172 defines the function of the template that feature_1 676 uses. In various implementations, the value_template_function data field 1172 may indicate a SQL pivot query, in which case feature_1 676 uses some of the SQL pivot query templates stored in the first template function library 608. In various implementations, the value_template_function data field 1172 may indicate a SQL nested query, in which case feature_1 676 uses some of the SQL nested query templates stored in the second template function library 612.

Figure 12:
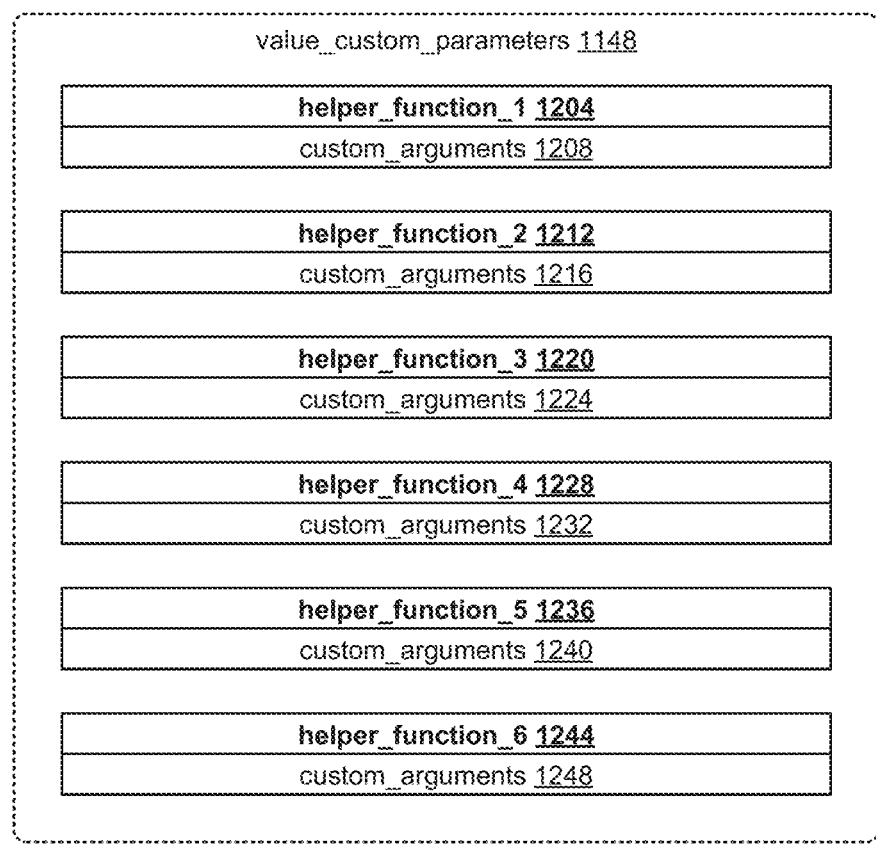
FIG. 12 is a block diagram showing an example structure for a custom parameters data field.

FIG. 12 is a block diagram showing an example structure for the value_custom_parameters data field 1148 of feature_1 676. As shown in FIG. 12, in some examples, the value_custom_parameters data field 1148 may include one or more helper functions and custom input arguments for the helper functions. In various implementations, the helper function and its custom input arguments may be referred to as custom parameters. In various implementations, the value_custom_parameters data field 1148 may include a helper_function_1 data field 1204 and a custom_arguments data field 1208 for the helper_function_1 data field 1204. In various implementations, the helper_function_1 data field 1204 may specify a "vars_select" helper function, and the custom_arguments data field 1208 may specify "MemberID" as input arguments. In various implementations, the input arguments of the custom_arguments data field may specify any form of identification related to a client, product, account, location, or any other property. In various implementations, the value_custom_parameters data field 1148 may include a helper_function_2 data field 1212 and a custom_arguments data field 1216 for the helper_function_2 data field 1212. In various implementations, the helper_function_2 data field 1212 may specify a "gb_vars_list" helper function and the custom_arguments data field 1216 may specify "MemberID" as input arguments.

In various implementations, the value_custom_parameters data field 1148 may include a helper_function_3 data field 1220 and a custom_arguments data field 1224 for the helper_function_3 data field 1220. In various implementations, the helper_function_3 data field 1220 may specify a "anchor_dt" helper function and the custom_arguments data field 1224 may specify an input argument as a string literal such as "2020-01-01," or a string that references a column name (such as a date field in a relational database). By using a string that references a different data structure, custom values may be provided to the custom_arguments data field 1224 via the user interface or by referring to a relational database. In various implementations, the value_custom_parameters data field 1148 may include a helper_function_4 data field 1228 and a custom_arguments data field 1232 for the helper_function_4 data field 1228. In various implementations, the helper_function_4 data field 1228 may specify a "where_filter_additions" helper function and the custom_arguments data field 1232 may specify "False" as input arguments. In various implementations, specifying "False" as an input argument may be a way to leave an argument from a helper function or template empty, making the function or template more flexible. In various implementations, the "where_filter_additions" helper function may be a way to add additional filters to an otherwise fixed set of filters specified by a specific feature in the feature library 616. In various implementations, the "where_filter_additions" helper function allows for the feature library 616 to contain domain expertise in its querying of the relational database, but allow flexibility for each user to provide some additional customiziation. In various implementations, the value_custom_parameters data field 1148 may include a helper_function_5 data field 1236 and a custom_arguments data field 1240 for the helper_function_5 data field 1236. In various implementations, the helper_function_5 data field 1236 may specify a "join_schema" helper function and the custom_arguments data field 1240 may specify "False" as input arguments. In various implementations, the value_custom_parameters data field 1148 may include a helper_function_6 data field 1244 and a custom_arguments data field 1248 for the helper_function_6 data field 1244. In various implementations, the helper_function_6 data field 1244 may specify a "join_table" helper function and the custom_arguments data field 1248 may specify "False" as input arguments.

FIG. 13 is a block diagram showing an example structure for the value_query_parameters data field 1156 of feature_1 676. As shown in FIG. 13, in some examples, the value_query_parameters data field 1156 may include one or more helper functions and custom arguments for the helper functions. In various implementations, the helper function and its custom arguments may be referred to as query parameters.

In various implementations, the value_query_parameters 1172 data field may include a helper_function_7 data field 1302 and a custom_arguments data field 1304 for the helper_function_7 data field 1302. In various implementations, the helper_function_7 data field 1302 may specify a "time_col_svc" helper function, and the custom_arguments data field 1304 may specify "DOSBegin" as input arguments. In various implementations, the value_query_parameters 1172 data field may include a helper_function_8 data field 1306 and a custom_arguments data field 1308 for the helper_function_8 data field 1306. In various implementations, the helper_function_8 data field 1306 may specify a "from_schema" helper function, and the custom_arguments data field 1308 may specify a source database as input arguments. As an example for context only, the source database may be specified as "OSS_PROVISIONING_V".

In various implementations, the value_query_parameters 1172 data field may include a helper_function_9 data field 1310 and a custom_arguments data field 1312 for the helper_function_9 data field 1310. In various implementations, the helper_function_9 data field 1310 may specify a "from_table" helper function, and the custom_arguments data field 1312 may specify "sdoGBSAClaim" as input arguments. In various implementations, the value_query_parameters 1172 data field may include a helper_function_10 data field 1314 and a custom_arguments data field 1316 for the helper_function_10 data field 1314. In various implementations, the helper_function_10 data field 1314 may specify a "time_col_pd" helper function, and the custom_arguments data field 1316 may specify "PaidDateKey" as input arguments. In various implementations, the value_query_parameters 1172 data field may include a helper_function_11 data field 1318 and a custom_arguments data field 1320 for the helper_function_11 data field 1318. In various implementations, the helper_function_11 data field 1318 may specify a "time_col_pd_end" helper function, and the custom_arguments data field 1320 may specify "3" as input arguments.

In various implementations, the value_query_parameters 1172 data field may include a helper_function_12 data field 1322 and a custom_arguments data field 1324 for the helper_function_12 data field 1322. In various implementations, the helper_function_12 data field 1322 may specify a "where_str" helper function, and the custom_arguments data field 1324 may specify "1=1 AND a.Level2Bucket in ('Inpatient Acute', 'Inpatient Behavioral Health', 'Inpatient LTAC', 'Inpatient Rehab', 'Inpatient SNF')" as input arguments. In various implementations, the "where_str" helper function can specify custom filters for a data table that meets the user's needs. In various implementations, the value_query_parameters 1172 data field may include a helper_function_13 data field 1326 and a custom_arguments data field 1328 for the helper function_13 data field 1326. In various implementations, the helper_function_13 data field 1326 may specify a "vars_sum" helper function, which specifies a list of variables of arbitrary length as input arguments and will apply the sum function to one of them. These implementations may be examples of the template providing a framework to accomplish a goal while maintaining the flexibility for custom implementations of the feature instance to mee the needs of multiple users. In various implementations, the custom_arguments data field 1328 may specify "AllowedAmt, TotalPaid" as input arguments. In various implementations, the value_query_parameters 1172 data field may include a helper_function_14 data field 1330 and a custom_arguments data field 1332 for the helper function_14 data field 1330. In various implementations, the helper_function_14 data field 1330 may specify a "vars_avg" helper function, and the custom_arguments data field 1332 may specify "False" as input arguments.

In various implementations, the value_query_parameters 1172 data field may include a helper_function_15 data field 1334 and a custom_arguments data field 1336 for the helper_function_15 data field 1334. In various implementations, the helper_function_15 data field 1334 may specify a "vars_cnt" helper function, and the custom_arguments data field 1336 may specify "False" as input arguments. In various implementations, instead of specifying the "vars_cnt" helper function, the helper_function_15 data field 1334 may specify any SQL function (such as count, sum, max, min, etc.) supported by the underlying helper function and template. In various implementations, the value_query_parameters 1172 data field may include a helper_function_16 data field 1338 and a custom_arguments data field 1340 for the helper function_16 data field 1338. In various implementations, the helper_function_16 data field 1338 may specify a "vars_max" helper function, and the custom_arguments data field 1340 may specify "False" as input arguments. In various implementations, the value_query_parameters 1172 data field may include a helper_function_17 data field 1342 and a custom_arguments data field 1344 for the helper_function_17 data field 1342. In various implementations, the helper_function_17 data field 1342 may specify a "vars_min" helper function, and the custom_arguments data field 1344 may specify "False" as input arguments.

In various implementations, the value_query_parameters 1172 data field may include a helper_function_18 data field 1346 and a custom_arguments data field 1348 for the helper_function_18 data field 1346. In various implementations, the helper_function_18 data field 1346 may specify a "vars_dcnt" helper function, and the custom_arguments data field 1348 may specify "ClaimID" as input arguments. In various implementations, the value_query_parameters 1172 data field may include a helper_function_19 data field 1350 and a custom_arguments data field 1352 for the helper_function_19 data field 1350. In various implementations, the helper_function_19 data field 1350 may specify a "vars_cond_cnt_like_dict" helper function, and the custom_arguments data field 1352 may specify "False" as input arguments. In various implementations, the value_query_parameters 1172 data field may include a helper_function_20 data field 1354 and a custom_arguments data field 1356 for the helper_function_20 data field 1354. In various implementations, the helper_function_20 data field 1354 may specify a "vars_cond_cnt_like_any_dict" helper function, and the custom_arguments data field 1356 may specify "False" as input arguments.

In various implementations, the value_query_parameters 1172 data field may include a helper_function_21 data field 1358 and a custom_arguments data field 1360 for the helper_function_21 data field 1358. In various implementations, the helper_function_21 data field 1358 may specify an instance of a feature stored in the feature library 616 and the custom_arguments data field 1360 may specify a custom naming convention to suite the user's needs. In various implementations, the helper_function_21 data field 1358 may specify an "experience_feat_name" helper function, and the custom_arguments data field 1360 may specify "inp_claim_" as input arguments. In various implementations, the value_query_parameters 1172 data field may include a helper_function_22 data field 1362 and a custom_arguments data field 1364 for the helper function_22 data field 1362. In various implementations, the helper_function_22 data field 1362 may specify a custom parameter—such as "svc beg lag" being passed into the helper function, and the custom_arguments data field 1364 may specify "−15" as input arguments. In various implementations, the value_query_parameters 1172 data field may include a helper_function_23 data field 1366 and a custom_arguments data field 1368 for the helper function_23 data field 1366. In various implementations, the helper_function_23 data field 1366 may specify a "svc_end_lag" helper function, and the custom_arguments data field 1368 may specify "−3" as input arguments. In various implementations, the value_query_parameters 1172 data field may include a helper_function_24 data field 1370 and a custom_arguments data field 1372 for the helper_function_24 data field 1370. In various implementations, the helper_function_24 data field 1370 may specify a "database type" argument—such as a "db_type" helper function—to specify which second language supported by the system should be used (e.g., a specific SQL database). In various implementations, the custom_arguments data field 1372 may specify "td" as input arguments.

In various implementations, the feature described with reference to FIGS. 11-13 may be a data structure formatted as a JavaScript Object Notation (JSON) file. FIG. 14 shows an example JSON file corresponding to an example feature described with reference to FIGS. 11-13.

Flowcharts

Figure 15:
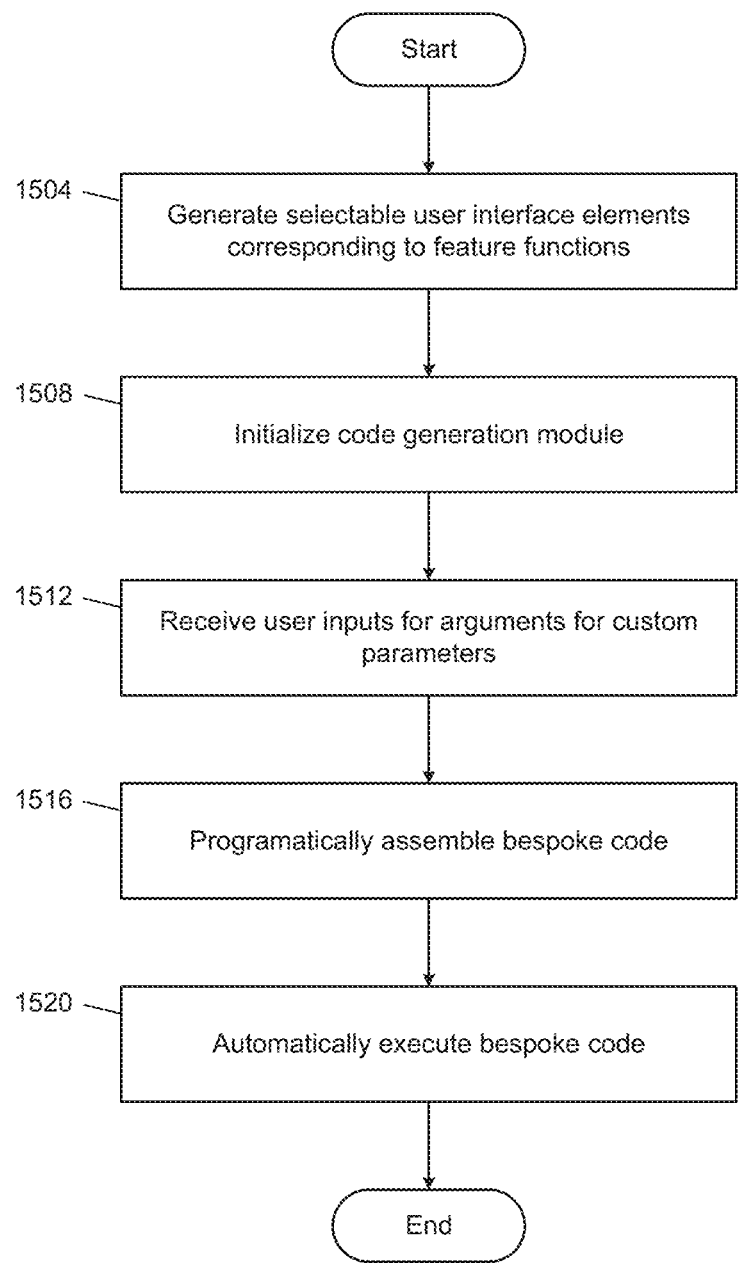
FIG. 15 is a flowchart of an example process for automatically generating a graphical user interface and automatically generating bespoke code in response to inputs to the graphical user interface.

FIG. 15 is a flowchart of an example process for automatically generating a graphical user interface and automatically generating bespoke code in response to inputs to the graphical user interface. Control begins at 1504. At 1504, the code generation module 416 generates selectable user interface elements corresponding to feature functions. For example, the code generation module 416 may generate a selectable user interface element corresponding to one or more of the features stored in the feature library 616. In various implementations, the code generation module 416 may be configured to automatically generate and/or execute bespoke code in response to the user selecting one of the selectable user interface elements. After the user selects one or more of the selectable user interface elements, control proceeds to 1508. At 1508, the code generation module 416 begins an initialization process. After the initialization process is complete, control proceeds to 1512.

At 1512, the code generation module 416 receives user inputs for the custom parameters loaded by the code generation module 416. For example, the code generation module 416 receives custom arguments for the helper functions of the custom parameters. Control proceeds to 1516. At 1516, the code generation module 416 automatically assembles bespoke code. For example, the code generation module 416 automatically generates bespoke code using the helper functions and the custom arguments of the custom parameters. In various implementations, the code generation module 416 automatically generates bespoke code using the helper functions and custom arguments of the custom parameters and the helper functions and query arguments of the query parameters. In various implementations, the code generation module 416 automatically generates bespoke code using the helper functions and query arguments of the query parameters. After the bespoke code is generated, control proceeds to 1520. At 1520, the bespoke code is automatically executed.

Figure 16:
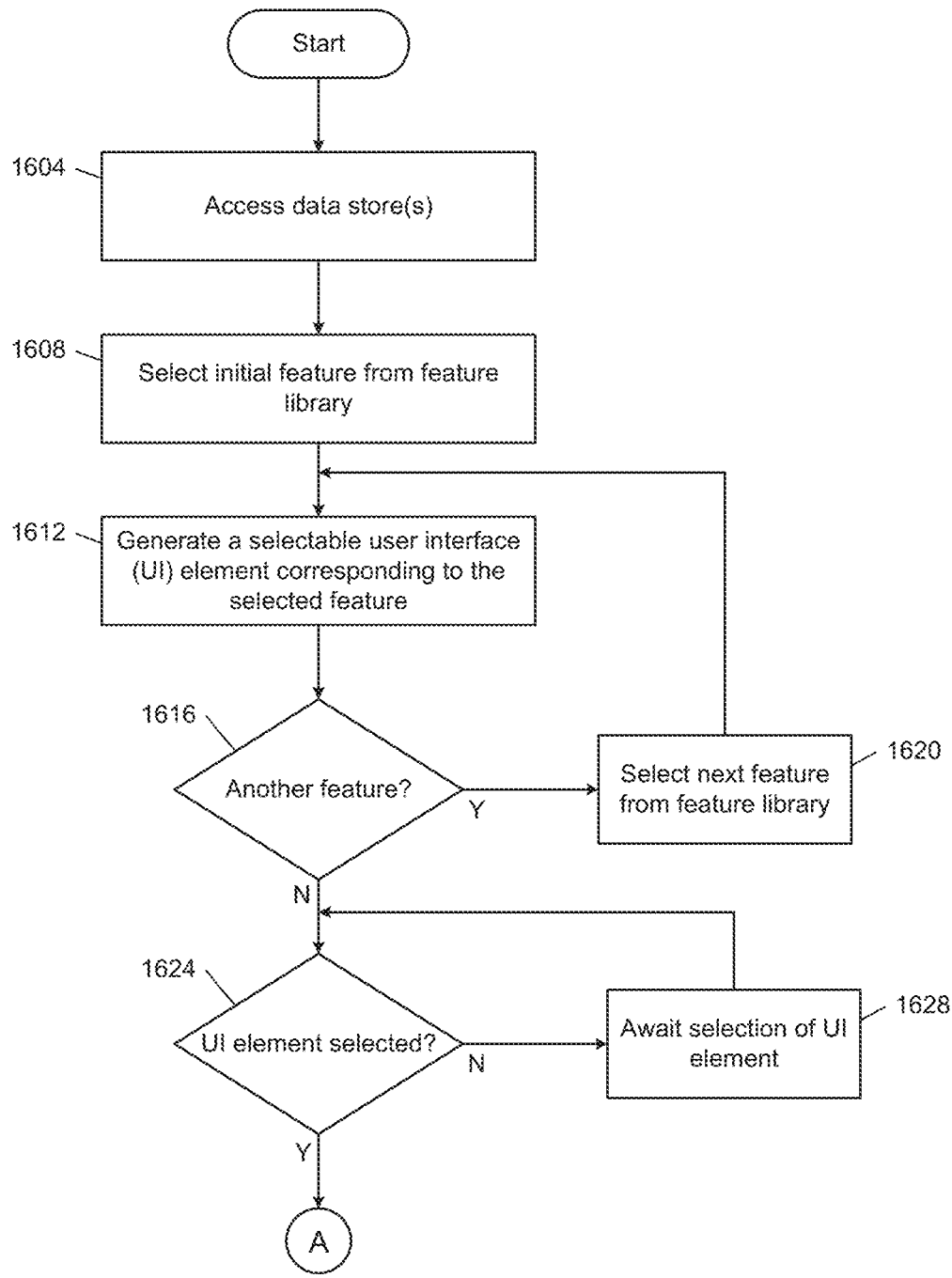
FIG. 16 is a flowchart of an example process for automatically generating selectable user interface elements corresponding to feature functions.

FIG. 16 is a flowchart of an example process for automatically generating selectable user interface elements corresponding to feature functions, such as at 1504 of FIG. 15. At 1604, the code generation module 416 accesses the feature library 616 in the data store(s) 420. Control proceeds to 1608. At 1608, the code generation module 416 selects an initial feature from the feature library 616. Control proceeds to 1612. At 1612, the code generation module 416 generates a selectable user interface element corresponding to the feature selected at 1608. Control proceeds to 1616. At 1616, the code generation module 416 determines whether another feature that has not been selected is present in the feature library 616. If at 1616, the code generation module 416 determines that another feature that has not yet been selected is present, control proceeds to 1620. Otherwise, if all features have been selected, control to 1624.

At 1620, the code generation module 416 selects the next feature from the feature library 616 and proceeds back to 1612. At 1624, the code generation module 416 determines whether one of the selectable user interface elements generated at 1612 have been selected by the user. If at 1624 the code generation module 416 determines that one of the selectable user interface elements have not been selected, control proceeds to 1628. At 1628, the code generation module 416 awaits selection of one of the selectable user interface elements and proceeds back to 1624. If at 1624 the code generation module 416 determines that one of the selectable user interface elements has been selected, control proceeds to 1704 of FIG. 17.

Figure 17:
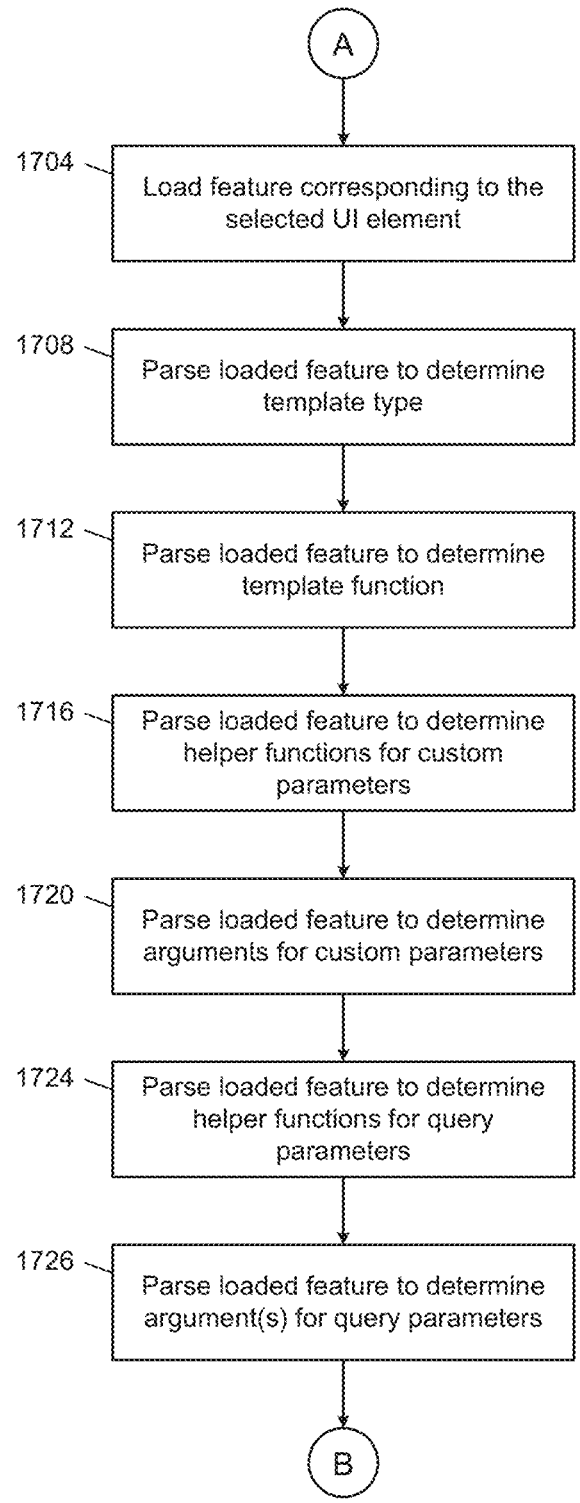
FIG. 17 is a flowchart of an example process for initializing a code generation module to generate bespoke code.

FIG. 17 is a flowchart of an example process for initializing the code generation module 416 to generate bespoke code, such as at 1508 of FIG. 15. At 1704, the code generation module 416 loads the feature from the feature library 616 corresponding to the selected user interface element. Control proceeds to 1708. At 1708, the code generation module 416 parses the loaded feature to determine the template type specified by the loaded feature. For example, if the selectable user interface element corresponds to feature_1 676 and feature_1 676 is loaded, then the code generation module 416 may parse attribute_template_type 1160 and/or value_template_type 1164 to determine that a "write_sql" template type is to be used. Control proceeds to 1712. At 1712, the code generation module 416 may parse the loaded feature to determine the template function specified by the loaded feature. For example, if feature_1 676 is loaded, the code generation module 416 may parse attribute_template_function 1168 and/or value_template_function 1172 to determine that the SQL pivot query template is loaded. Control proceeds to 1716.

At 1716, the code generation module 416 parses the loaded feature to determine the helper functions specified by the custom parameters. For example, if feature_1 676 is loaded, then the code generation module 416 determines that helper_function_1 1204, helper_function_2 1212, helper_function_3 1220, helper_function_4 1228, helper_function_5 1236, and helper_function_6 1244 will be needed to generate bespoke code according to feature_1 676. Control proceeds to 1720. At 1720, the code generation module 416 parses the loaded feature to determine the arguments needed for the helper functions specified by the custom parameters. For example, if feature_1 676 is loaded, then the code generation module 416 determines that custom_arguments 1208, custom_arguments 1216, custom_arguments 1224, custom_arguments 1232, custom_arguments 1240, and custom_arguments 1248 will be needed to generate bespoke code according to feature_1 676. Control proceeds to 1724.

At 1724, the code generation module 416 parses the loaded feature to determine helper functions specified by the query parameters. For example, if feature_1 676 is loaded, then the code generation module 416 determines that helper_function_7 1302, helper_function_8 1306, helper_function_9 1310, helper_function_10 1314, helper_function_11 1318, helper_function_12 1322, helper_function_13 1326, helper_function_14 1330, helper_function_15 1334, helper_function_16 1338, helper_function_17 1342, helper_function_18 1346, helper_function_19 1350, helper_function_20 1354, helper_function_21 1358, helper_function_22 1362, helper_function_23 1366, and helper_function_24 1370 will be needed to generate bespoke code according to feature_1 676. Control proceeds to 1726.

At 1726, the code generation module 416 parses the loaded feature to determine the arguments specified by the query parameters. For example, if feature_1 676 is loaded, then the code generation module 416 determines that custom_arguments 1304, custom_arguments 1308, custom_arguments 1312, custom_arguments 1316, custom_arguments 1320, custom_arguments 1324, custom_arguments 1328, custom_arguments 1332, custom_arguments 1336, custom_arguments 1340, custom_arguments 1344, custom_arguments 1348, custom_arguments 1352, custom_arguments 1356, custom_arguments 1360, custom_arguments 1364, custom_arguments 1368, and custom_arguments 1372 will be needed to generate bespoke code according to feature_1 676.

In various implementations, if at 1712 the code generation module 416 determines that the template function is not present in the first template function library 608 or the second template function library 612, then the code generation module 416 generates an error message to the user interface indicating that the required template function is missing. In various implementations, if at 1716 and/or 1724 the code generation module 416 determines that any of the required helper functions are not present in helper function library 604, then the code generation module 416 generates an error message to the user interface indicating that the required helper function is missing. After the code generation module 416 parses the loaded feature to determine the arguments specified by the query parameters, control proceeds to 1804.

Figure 18:
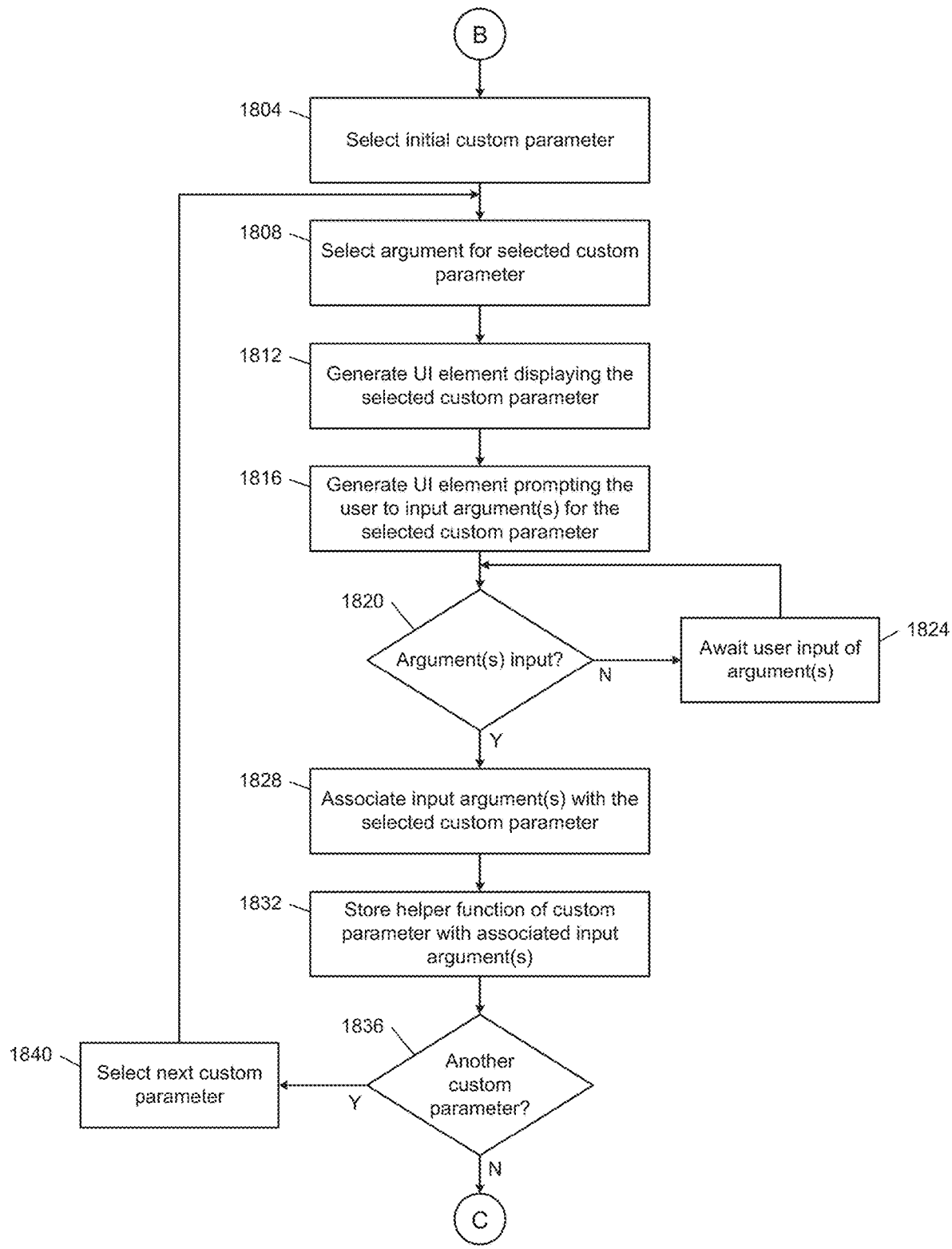
FIG. 18 is a flowchart of an example process for receiving user inputs for populating arguments of custom parameters.

FIG. 18 is a flowchart of an example process for receiving user inputs for populating the arguments of the custom parameters, such as at 1512 of FIG. 15. At 1804, the code generation module 416 selects the initial custom parameter of the loaded feature. Control proceeds to 1808. At 1808, the code generation module 416 selects the argument for the selected custom parameter. Control proceeds to 1812. At 1812, the code generation module 416 generates a first user interface element displaying the selected custom parameter. For example, the first user interface element may display the helper function associated with the selected custom parameter and/or the argument required by the helper function. Control proceeds to 1816. At 1816, the code generation module 416 generates a second user interface element prompting the user to input arguments for the selected custom parameter. In various implementations, the second user interface element may include an input field. In various implementations, the second user interface element may include a selectable element. Control proceeds to 1820.

At 1820, the code generation module 416 determines whether arguments were input into the second user interface element and/or whether the user selected the second user interface element. If at 1820 the code generation module 416 determines that arguments were not input into the second user interface element and/or the user did not select the second user interface element, control proceeds to 1824 where the code generation module 416 awaits input of the arguments and/or selection of the second user interface element. Control proceeds back to 1820. If at 1820 the code generation module 416 determines that arguments were input into the second user interface element and/or the user selected the second user interface element, control proceeds to 1828. At 1828, the code generation module 416 associates the arguments input by the user with the selected custom parameter. Control proceeds to 1832.

At 1832, the code generation module 416 stores the helper function of the custom parameter with the associated input arguments. In various implementations, the updated custom parameter (including the input arguments) may be saved to the data store(s) 420. Control proceeds to 1836. At 1836, the code generation module 416 determines whether another custom parameter is present in the feature. If at 1840 the code generation module 416 determines that another custom parameter is present in the feature, control proceeds to 1840. At 1840, the code generation module 416 selects the next custom parameter and proceeds back to 1808. If at 1840 the code generation module 416 determines that another custom parameter is not present in the feature, control proceeds to 1904.

Figure 19:
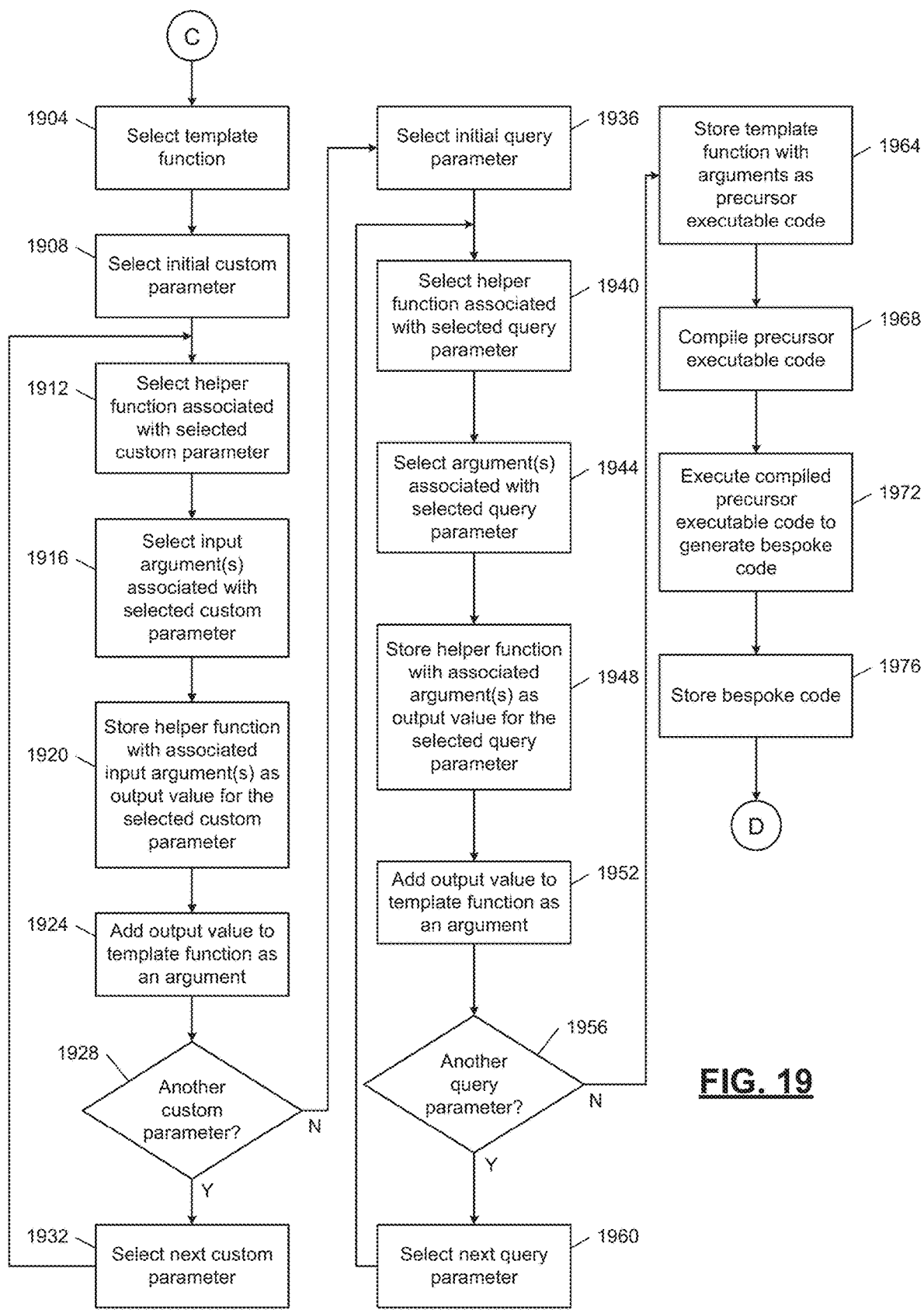
FIG. 19 is a flowchart of an example process for automatically assembling bespoke code according to a feature.

FIG. 19 is a flowchart of an example process for automatically assembling bespoke code according to a feature, such as at 1516 of FIG. 15. At 1904, the code generation module 416 selects the template function specified by the loaded feature, such as the feature loaded at 1704. Control proceeds to 1908. At 1908, the code generation module 416 selects the initial custom parameter specified by the loaded feature. Control proceeds to 1912. At 1912, the code generation module 416 selects the helper function associated with the selected custom parameter. Control proceeds to 1916. At 1916, the code generation module 416 selects input arguments associated with the custom parameter. Control proceeds to 1920. At 1920, the code generation module 416 stores the helper function with the associated input argument(s) as the output value for the selected custom parameter. Control proceeds to 1924.

At 1924, the code generation module 416 adds the output value to the template function selected at 1904 as an argument for the template function. Control proceeds to 1928. At 1928, the code generation module 416 determines whether another custom parameter is present in the feature. If at 1928 the code generation module 416 determines that another custom parameter is present in the feature, control proceeds to 1932, where the code generation module 416 selects the next custom parameter in the feature and proceeds back to 1912. If at 1928 the code generation module 416 determines that another custom parameter is not present in the feature, control proceeds to 1936. At 1936, the code generation module 416 selects the initial query parameter present in the feature. Control proceeds to 1940.

At 1940, the code generation module 416 selects the helper function associated with the selected query parameter. Control proceeds to 1944. At 1944, the code generation module 416 selects the argument associated with the selected query parameter. Control proceeds to 1948. At 1948, the code generation module 416 stores the selected helper function with the associated selected argument(s) as the output value for the selected query parameter. Control proceeds to 1952. At 1952, the code generation module 416 adds the output value to the template function as an argument. Control proceeds to 1956. At 1956, the code generation module 416 determines whether another query parameter is present in the feature. If at 1956 the code generation module 416 determines that another query parameter is present in the feature, control proceeds to 1960, where the code generation module 416 selects the next query parameter and proceeds back to 1936. If at 1956 the code generation module 416 determines that another query parameter is not present in the feature, control proceeds to 1964, where the code generation module 416 stores the template function with the arguments added as precursor executable code. In various implementations, the "sql_pivot_query" function with the arguments inside of the parenthesis in FIG. 7 and the "sql_nested_query" function with the arguments inside of the parenthesis in FIG. 9 may be illustrative examples of precursor executable code. Control proceeds to 1968.

At 1968, the code generation module 416 compiles the precursor executable code. Control proceeds to 1972. At 1972, the code generation module executes the compiled precursor execution code to generate bespoke code. In various implementations, FIG. 8 shows bespoke code generated after the precursor executable code of FIG. 7 is compiled and executed. In various implementations, FIG. 10 shows bespoke code generated after the precursor executable code of FIG. 9 is compiled and executed. Control proceeds to 1976. At 1976, the code generation module 416 stores the bespoke code. In various implementations, the bespoke code can be stored in storage device(s) 110. In various implementations, the bespoke code can be stored in data store(s) 420. In various implementations, the bespoke code can be stored in shared system resources 408. In various implementations, the bespoke code can be stored in shared system resources 428. Control proceeds to 2004.

Figure 20:
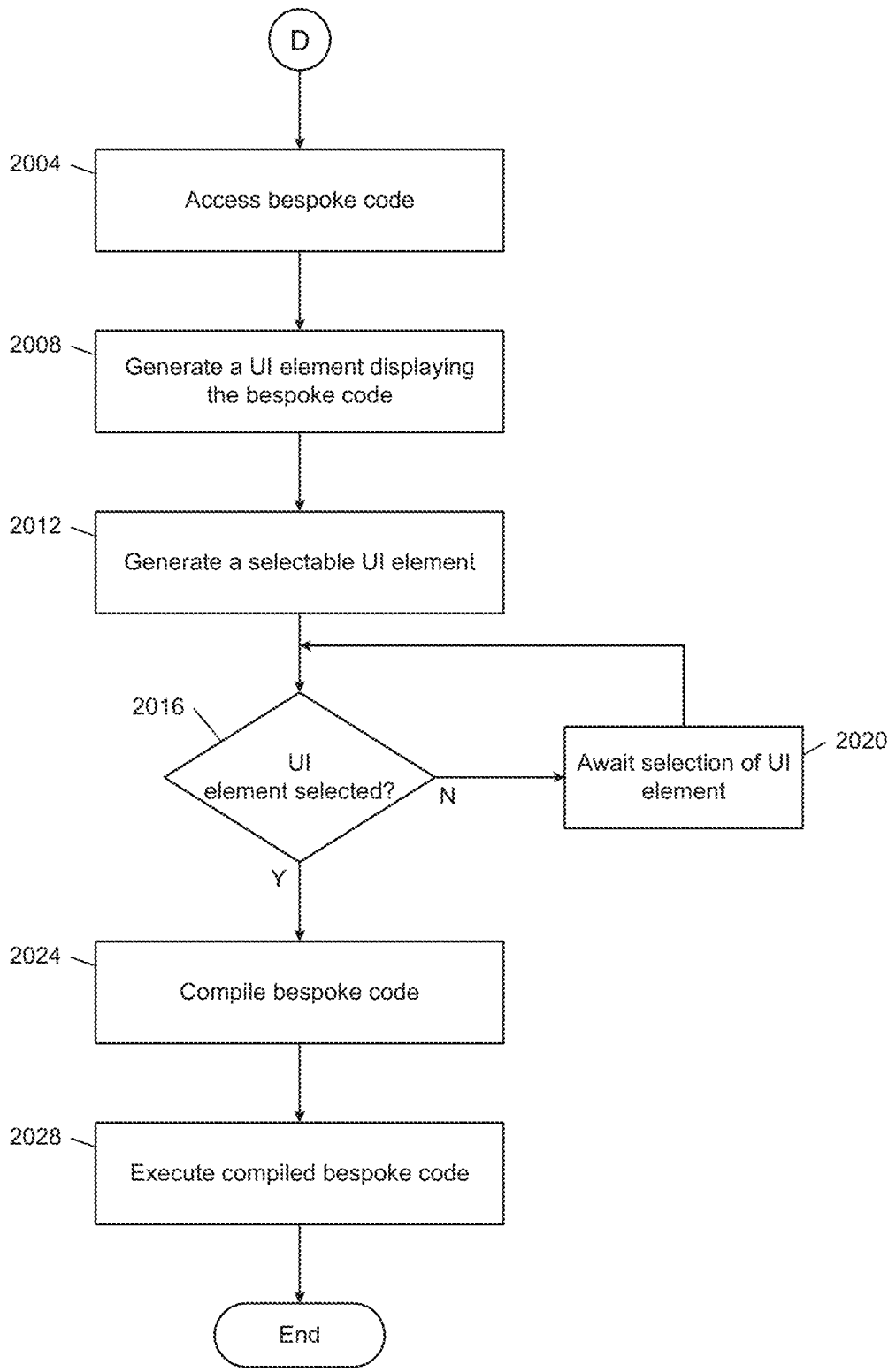
FIG. 20 is a flowchart of an example process for automatically executing bespoke code.

FIG. 20 is a flowchart of a process for automatically executing the bespoke code, such as at 1520 of FIG. 15. At 2004, the code generation module 416 accesses the bespoke code. For example, the code generation module 416 accesses the bespoke code stored in storage device(s) 110, data store(s) 420, shared system resources 408, and/or shared system resource 428. Control proceeds to 2008. At 2008, the code generation module 416 generates a first user interface element corresponding to the bespoke code. In various implementations, the first user interface element may display a summary of the bespoke code to the user. In various implementations, the first user interface element may display at least a portion of the bespoke code to the user. In various implementations, the first user interface element may display the entirety of the bespoke code to the user. Control proceeds to 2012.

At 2012, the code generation module 416 generates a second user interface element. In various implementations, the second user interface element may be a selectable element. Control proceeds to 2016. At 2016, the code generation module 416 determines whether the second user interface element was selected by the user. If at 2016 the code generation module 416 determines that the second user interface element was not selected by the user, control proceeds to 2020, where the code generation module 416 awaits selection of the second user interface element and proceeds back to 2016. If at 2016 the code generation module 416 determines that the second user interface element was selected by the user, control proceeds to 2024. At 2024, the code generation module 416 compiles the bespoke code. Control proceeds to 2028. At 2028, the code generation module 416 executes the compiled bespoke code.

In various implementations, the storage device(s) 110 may contain data held in one or more relational database management systems. For example, in various implementations, the order data 118, the member data 120, the claims data 122, the drug data 124, the prescription data 126, and/or the plan sponsor data 128 may be held in one or more relational database management systems. In various implementations, the compiled bespoke code may be configured to query one or more of the relational database management systems of the storage device(s) 110 and return results of the query to the user device 108 and/or the feature analysis device 400. In various implementations, the user device 108 and/or the feature analysis device 400 may be configured to display the results of the query to the user, such as on the display 432.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set in other words, in some circumstances a "set" may have zero elements. The term "non-empty set" may be used to indicate exclusion of the empty set—in other words, a non-empty set will always have one or more elements. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for automatically generating computer-executable code, the system comprising:
a user device including:
  a communications interface,
  a code generation module, and
  a data store including a helper function library, a template function library, and a feature library, wherein the helper function library includes one or more helper functions, wherein the template function library contains one or more template functions, and wherein the feature library contains one or more features; and a storage device operatively coupled to the code generation module via a network and the communications interface, wherein the storage device includes a relational database management system, wherein the code generation module is configured to:
parse a selected feature from the feature library to determine a first helper function of the one or more helper functions and a selected template function of the one or more template functions,
receive a first argument for the first helper function,
generate a first output value by associating the first helper function with the first argument,
generate precursor executable code by adding the first output value to the selected template function as a first argument of the selected template function, and
execute the precursor executable code to generate bespoke code, wherein the bespoke code is in a domain-specific programming language and is configured to cause the user device to query the relational database management system.

2. The system of claim 1 wherein the code generation module is configured to:
parse the selected feature from the feature library to determine a second helper function of the one or more helper functions; and
parse the selected feature from the feature library to determine a second argument for the second helper function.

3. The system of claim 2 wherein the code generation module is configured to generate a second output value by associating the second helper function with the second argument.

4. The system of claim 3 wherein the code generation module is configured to generate precursor executable code by adding the second output value to the selected template function as a second argument of the selected template function.

5. The system of claim 4 wherein the code generation module is configured to:
generate a first user interface element that is configured to receive a set of arguments from a user; and
in response to receiving the set of arguments, store the set of arguments as the first argument.

6. The system of claim 5 wherein the code generation module is configured to generate a second user interface element that is configured to display at least a portion of the bespoke code to the user.

7. The system of claim 6 wherein the code generation module is configured to:
generate a third user interface element that is selectable by the user; and
in response to the user selecting the third user interface element, automatically execute the bespoke code.

8. The system of claim 7 wherein the bespoke code includes Structured Query Language (SQL) code.

9. The system of claim 2 wherein the data store includes the second argument.

10. The system of claim 9 wherein the feature includes:
a custom parameters data field including the first helper function; and
a query parameters data field including the second helper function and the second argument.

11. A computerized method for automatically generating computer-executable code, the method comprising:
parsing a selected feature from a feature library to determine a first helper function, a second helper function, a second argument for the second helper function, and a selected template function;
receiving a first argument for the first helper function;
generating a first output value by associating the first helper function with the first argument;
generating a second output value by associating the second helper function with the second argument;
generating precursor executable code by:
adding the first output value to the selected template function as a first argument of the selected template function, and
adding the second output value to the selected template function as a second argument of the selected template function; and
executing the precursor executable code to generate bespoke code, wherein the bespoke code is in a domain-specific programming language and is configured to cause a user device to query a relational database management system.

12. The method of claim 11 further comprising:
generating a first user interface element that is configured to receive a set of arguments from a user; and
in response to receiving the set of arguments, storing the set of arguments as the first argument.

13. The method of claim 12 further comprising generating a second user interface element, wherein the second user interface element is configured to display at least a portion of the bespoke code to the user.

14. The method of claim 13 further comprising:
generating a third user interface element, wherein the third user interface element is selectable by the user; and
in response to the user selecting the second user interface element, automatically executing the bespoke code.

15. The method of claim 14 wherein the bespoke code includes Structured Query Language (SQL) code.

16. A non-transitory computer-readable medium comprising executable instructions for automatically generating computer-executable code, wherein the executable instructions include:
parsing a selected feature from a feature library to determine a first helper function, a second helper function, a second argument for the second helper function, and a selected template function;
receiving a first argument for the first helper function;
generating a first output value by associating the first helper function with the first argument;
generating a second output value by associating the second helper function with the second argument;
generating precursor executable code by:
adding the first output value to the selected template function as a first argument of the selected template function, and
adding the second output value to the selected template function as a second argument of the selected template function; and
executing the precursor executable code to generate bespoke code, wherein the bespoke code is in a domain-specific programming language and is configured to cause a user device to query a relational database management system.

17. The non-transitory computer-readable medium of claim 16 wherein the executable instructions include:
generating a first user interface element that is configured to receive a set of arguments from a user; and
in response to receiving the set of arguments, storing the set of arguments as the first argument.

18. The non-transitory computer-readable medium of claim 17 wherein the executable instructions include generating a second user interface element, wherein the second user interface element is configured to display at least a portion of the bespoke code to the user.

19. The non-transitory computer-readable medium of claim 18 wherein the executable instructions include:
   generating a third user interface element, wherein the third user interface element is selectable by the user; and
   in response to the user selecting the second user interface element, automatically executing the bespoke code.

20. The non-transitory computer-readable medium of claim 19 wherein the bespoke code includes Structured Query Language (SQL) code.

* * * * *